United States Patent

Seip

[11] 3,835,968
[45] Sept. 17, 1974

[54] ADJUSTING DEVICE FOR DRUM BRAKES
[75] Inventor: Hermann Seip, Bad Vilbek, Germany
[73] Assignee: ITT Industries, New York, N.Y.
[22] Filed: May 3, 1973
[21] Appl. No.: 356,981

[30] Foreign Application Priority Data
July 28, 1972 Germany............................ 2237050

[52] U.S. Cl. ...................... 188/196 P, 188/79.5 GT
[51] Int. Cl. ............................................. F16d 65/54
[58] Field of Search ... 188/79.5 GT, 196 P, 196 BA

[56] References Cited
UNITED STATES PATENTS
2,018,567   10/1935   Page ............................ 188/79.5 GT
2,030,848   2/1936   Boughton et al. ........... 188/79.5 GT
FOREIGN PATENTS OR APPLICATIONS
397,984   9/1933   Great Britain............... 188/79.5 GT Primary Examiner—Duane A. Reger
Attorney, Agent, or Firm—John T. O'Halloran; Menotti J. Lombardi; Alfred C. Hill

[57] ABSTRACT

This adjusting device compensates for brake lining wear in an internal brake shoe drum brake. Known adjusting devices for internal brake shoes have the disadvantage that a considerable force is necessary for actuation. In addition, there is a great likelihood of corrosion. The present invention relates to an adjusting device with an adjustable eccentric which requires smaller adjusting forces and is protected from corrosion. The improvement is achieved by providing a sealing arrangement in the eccentric to prevent corrosion and a frictional jamming element in the form of an S-shaped spring. This spring is prestressed with its ends lying against the inner wall of an inner bore of the adjusting eccentric. This spring is rigidly connected with the brake backing plate through intermediary components.

4 Claims, 2 Drawing Figures

PATENTED SEP 17 1974

3,835,968

ADJUSTING DEVICE FOR DRUM BRAKES

BACKGROUND OF THE INVENTION

This invention relates to an adjusting device for internal brake shoe drum brakes, particularly for motor vehicles, in which an adjustable eccentric grips a pin which extends with clearance into a brake shoe and which is attached pivotably in one direction to a brake backing plate through the intermediary of a frictional jamming element.

In known adjusting devices of this type the adjusting eccentric is provided by means of a spring plate pressed with one front surface upon the contact surfaces of the brake backing plate. If the clearance exceeds a given fixed value, the adjusting eccentric is twisted on these contact surfaces.

This known adjusting device has the disadvantage, that considerable forces are necessary for the twisting of the adjusting eccentric. Since the driving force by the spring plate as well as the properties of the contact surfaces can be different, considerable differences in the necessary forces for twisting the adjusting eccentric have to also be taken into consideration. These forces reduce the contact force of the brake shoes against the brake drum, so that during braking different braking moments may occur at the several vehicle wheels, so that a tendency of the vehicle to break away is developed. In the course of time it may even happen, that the adjusting eccentric corrodes. The known adjusting device is especially disadvantageous, when a sensitive braking has to be performed on wet or even icy road. Suppose, that one adjusting device is corroded or can only be actuated by a strong force and that for applying the brakes a twisting of the adjusting eccentrics is necessary in all brakes. In this case, at first only the brake shoes of the other three vehicle wheels are applied when the brake pedal is actuated. Then, when the point is reached where the radial forces produced by the pressure medium is large enough, the adjusting eccentric, which can only be actuated by a strong force or is corroded, is twisted and the brake shoes of this brake are applied. Thus, when sensitive braking is required, only three vehicle wheels are braked and this may cause the vehicle to break out. Also the danger of corroding exists in the known adjusting device because the whole adjusting device is exposed to the influence of the weather.

SUMMARY OF THE INVENTION

It is an object of the present invention to provide an adjusting device of the kind mentioned above in which only small forces are necessary for adjusting, in which corrosion is impossible and which are especially simple in their structure and, thus, cheap in production.

According to a feature of the present invention the above object is achieved by the provision of a frictional jamming element in the form of a S-shaped bent spring which is prestressed and supports itself by its ending parts against the inner wall of an inner bore of the adjusting eccentric, said spring being in turn attached fixedly to the brake backing plate.

In an advantageous embodiment of the invention the S-shaped bent spring is held in a radial slot of a support part, which is rigidly fixed to the brake backing plate at right angles to the plane of the brake backing plate. The support part supports the adjusting eccentric on a pivot provided thereby. At the lower end of the support part the inner bore of the adjusting eccentric is closed by means of a sealing ring present between the surface of the inner bore and the support part so that the adjusting device is completely closed to the external environment and, thus, is protected from the influences of the weather.

BRIEF DESCRIPTION OF THE DRAWING

Above-mentioned and other features and objects of this invention will become more apparent by reference to the following description taken in conjunction with the acompanying drawing, in which.

DESCRIPTION OF THE PREFERRED EMBODIMENT

Figure 1:
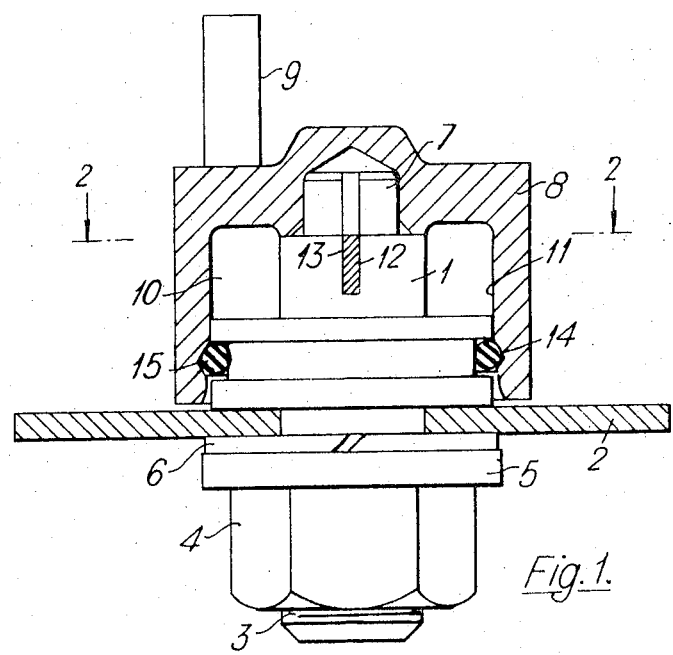
FIG. 1 is a longitudinal cross-sectional view, partially in elevation, of the adjusting device in accordance with the principles of the present invention.
Figure 2:
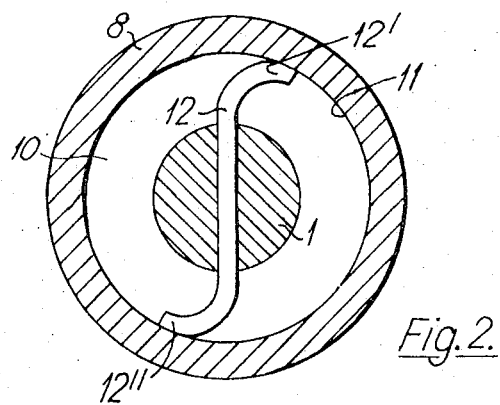
FIG. 2 is a transverse cross-sectional view taken along line 2—2 of FIG. 1.

As can be seen in FIG. 1 and 2, the adjusting device according to this invention consists of a support part 1, which is rigidly fixed to a brake backing plate 2. The support part 1 extends at right angles to the plane of brake backing plate 2. Support part 1 projects with a thread end 3 through brake backing plate 2 and is fastened to brake backing plate 2 by means of a hexagonal nut 4, a disk 5 and a spring ring 6.

On the opposite end of support part 1 a pivot is disposed which pivotably supports an adjusting eccentric 8. This adjusting eccentric 8 has a pin 9 which projects with clearance into a bore or a slot of a brake shoe, not shown here. The adjusting eccentric 8 has an inner bore 10 with an inner wall 11 and is put in inverted position on support part 1.

A frictional jamming element in the form of a S-shaped bent spring 12 is inserted in a slot 13 of support part 1. The S-shaped bent spring 12 is prestressed and has ending parts 12', 12'' pressing against inner wall 11 of inner bore 10.

Support part 1 has in the area of brake backing plate 2 nearly the same cross section as inner bore 10 of adjusting eccentric 8. In this area a surrounding groove 14 is provided in support part 1 and adjusting eccentric 8 into which is inserted a seal 15. Thus, inner bore 10 is completely closed so that the adjusting device according to this invention is completely protected against influences of the weather dust and dirt. The adjusting device according to this invention functions as follows:

If during the braking process a clearance occurs which is greater than the clearance between pin 9 and the bore or the slot in the brake shoe, adjusting eccentric 8 is turned. For this purpose adjusting eccentric 8 can move slightly in the adjusting direction, i.e., clock-wise in the embodiment shown here. When releasing the brake a twisting in the opposite direction is not possible, since ending parts 12' and 12'' of S-shaped spring 12 spread out against inner wall 11 of inner bore 10.

Finally it should be pointed out, that the frictional jamming element according to this invention can also be used in other adjusting devices for other applications, for example, for disk brakes.

While I have described above the principles of my invention in connection with specific apparatus it is to be clearly understood that this description is made only by way of example and not as a limitation to the scope of

I claim:

1. An adjusting device for internal brake shoes comprising:
   a brake backing plate;
   an adjustable eccentric having an inner bore;
   a pin attached to said adjustable eccentric projecting with clearance into one of said brake shoes;
   a frictional jamming element to pivotably attach said adjustable eccentric to said brake backing plate;
   said frictional jamming element including
      a S-shaped prestressed spring having its ending parts lying against the inner wall of said inner bore,
      said spring being rigidly connected to said brake backing plate; and
   a support part having a pivot portion, said support part being disposed at right angles to the plane of said brake backing plate and being rigidly fastened to said brake backing plate;
   said adjustable eccentric being disposed on said pivot portion;
   and
      said spring being held in a radial slot of said support part.

2. A device according to claim 1, further including
   a first annular groove disposed in the outer surface of said support part adjacent said brake backing plate;
   a second annular groove disposed in the inner wall of said inner bore in registry with said first groove; and
   a ring seal disposed in said first and second grooves.

3. A device according to claim 1, further including
   an arrangement disposed in said inner bore adjacent said brake backing plate to seal said inner bore to prevent penetration of an external environment into said inner bore.

4. An adjusting device for internal brake shoes comprising:
   a brake backing plate;
   an adjustable eccentric having an inner bore;
   a pin attached to said adjustable eccentric projecting with clearance into one of said brake shoes;
   a frictional jamming element to pivotably attach said adjustable eccentric to said brake backing plate;
   said frictional jamming element including
      a S-shaped prestressed spring having its ending parts lying against the inner wall of said inner bore,
      said spring being rigidly connected to said brake backing plate; and
   a support part having a pivot portion, said support part being disposed at right angles to the plane of said brake backing plate and being rigidly fastened to said brake backing plate;
   said adjustable eccentric being disposed on said pivot portion;
   a first annular groove in the outer surface of said support part adjacent said brake backing plate;
   a second annular groove disposed in the inner wall of said inner bore in registry with said first groove; and
   a ring seal disposed in said first and second grooves.

* * * * *